UNITED STATES PATENT OFFICE.

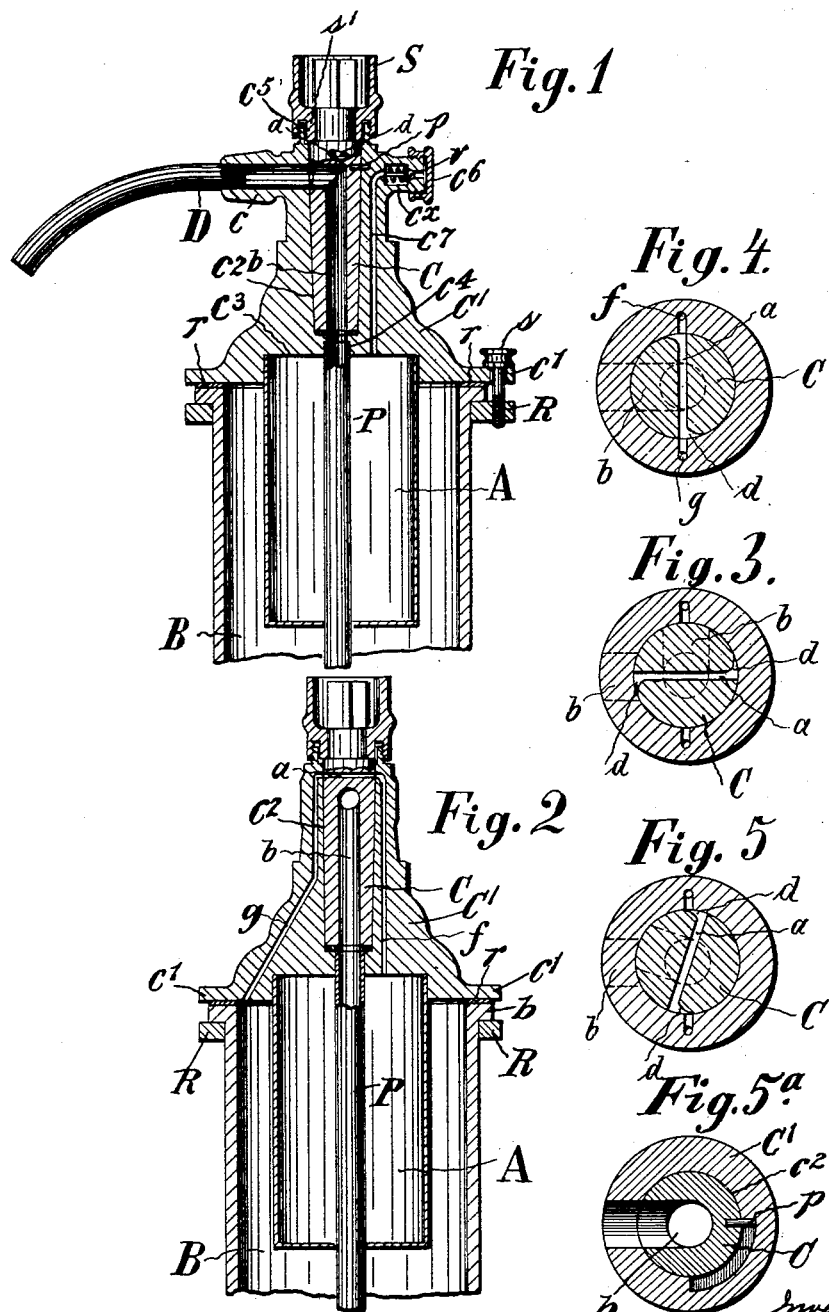

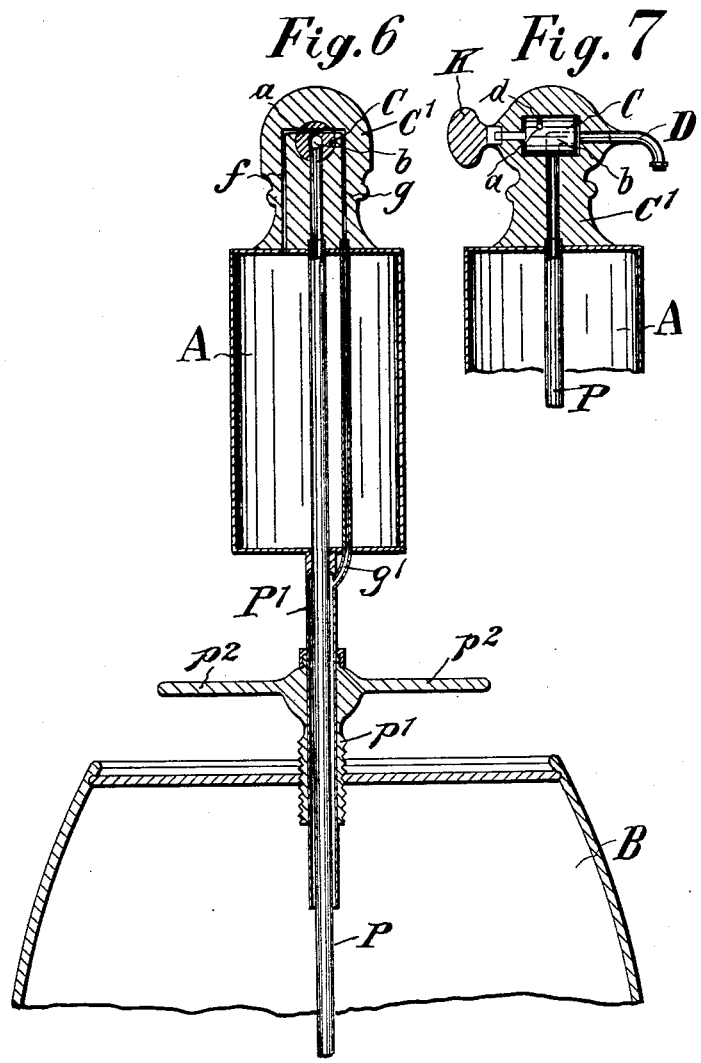

PHILIPP BACH, OF BERLIN, GERMANY, ASSIGNOR TO THE BIER-SIPHON-AKTIEN-GESELLSCHAFT, OF CASSEL, GERMANY.

APPARATUS FOR DISPENSING LIQUIDS BY PRESSURE OF GAS.

SPECIFICATION forming part of Letters Patent No. 587,635, dated August 3, 1897.

Application filed June 9, 1897. Serial No. 640,061. (No model.) Patented in Germany February 20, 1896, No. 88,287; in France February 28, 1896, No. 254,340; in Luxemburg April 19, 1896, No. 2,492; in England April 20, 1896, No. 8,280; in Belgium April 20, 1896, No. 120,949; in Hungary September 24, 1896, No. 9,545; in Italy September 30, 1896, XXXII, 42,656 and LXXXIII, 399; in Austria October 28, 1896, No. 46/4,335; in Turkey January 26, 1897, No. 562, and in Finland February 11, 1897, No. 687.

*To all whom it may concern:*

Be it known that I, PHILIPP BACH, manufacturer, a subject of the German Emperor, and a resident of Berlin, Germany, have invented certain new and useful Improvements in Apparatus for Dispensing Liquids by the Pressure of a Gas, (for which Letters Patent have been obtained in Belgium, No. 120,949, dated April 20, 1896; in Germany, No. 88,287, dated February 20, 1896; in France, No. 254,340, dated February 28, 1896, and patent of addition, dated April 22, 1896; in Great Britain, No. 8,280, dated April 20, 1896; in Italy, Vol. XXXII, 42,656, and Vol. LXXXIII, 399, dated September 30, 1896; in Luxemburg, No. 2,492, dated April 19, 1896; in Austria, No. 46/4,335, dated October 28, 1896; in Hungary, No. 9,545, dated September 24, 1896; in Finland, No. 687, dated February 11, 1897, and in Turkey, No. 562, dated January 26, 1897;) and I do hereby declare the following to be a full, clear, and exact description of the invention.

My invention has relation to apparatus for dispensing liquids by the pressure of a gas, and more particularly to that class of apparatus wherein the dispensing-valve (cock or faucet) is made to control the flow of gas to the vessel containing the liquid to be dispensed. The latter class of apparatus as constructed prior to my invention present disadvantages, particularly in that the discharge of the liquid from the holder cannot be effected until the supply of gas to the vessel is fully turned on, the gas thus acting with its full pressure on the liquid and expelling the latter with such force from the vessel as to cause it to be splashed or scattered by impact with the walls of the receiving vessel.

The primary object of my invention lies in the provision of means whereby the recited disadvantage can be obviated, in that the gas can be turned on gradually and the liquid gradually forced from the vessel which contains it.

My invention has for its further object certain improvements in the construction of the apparatus over those hitherto used, as will now be fully described in conjunction with the drawings, in which—

Figures 1 and 2 are vertical sectional views taken at right angles to each other and illustrating my invention in its application to a bottle or like vessel. Figs. 3 to 5, inclusive, are cross-sections in the plane of the gas-passages of the plug-valve and valve-casing, illustrating the position of the plug-valve when both liquid and gas passages are fully open, fully closed, and partially open, respectively. Fig. 5$^a$ is also a cross-sectional view of the valve-casing and valve-plug, taken in the plane of the stop-pin $p$, Fig. 1; and Figs. 6 and 7 are views similar to Figs. 1 and 2, illustrating my invention in its application to a barrel or cask, the vessel (bottle, barrel, or cask) in Figs. 1, 2, and 6 being partly broken away.

Referring to Figs. 1 to 5, inclusive, B indicates the storage vessel for the liquid to be dispensed, as a bottle, for instance, preferably of cylindrical form in cross-section, and provided at its upper open end with a rim or flange $b$, by means of which and a clamping-ring R and suitable bolts or thumb-screws $s$ the valve-casing $C'$ is secured to the vessel B, a suitable packing, as a rubber gasket $r$, being interposed between said valve-casing and vessel to form a fluid-tight joint, said casing being provided with a suitable flange $c'$ for the clamping-screws $s$. In the lower face of the valve-casing $C'$ is formed a circular recess $c^3$, and said casing has an axial bore or valve-seat $c^2$, that is contracted at its lower end $c^4$ and enlarged at its upper end $c^5$, which enlarged portion is screw-threaded exteriorly. At points below said enlarged portion $c^5$, and diametrically opposite each other, the casing $C'$ is provided with two branches—namely, a discharge or outflow branch $c$ for liquid, to which is secured a discharge-pipe D, and a supply branch $c^\times$, screw-threaded exteriorly and having a contracted inlet-passage whose inner end forms a seat for a conical check or back-pressure valve $v$, the said branch being normally closed by a screw-cap $c^6$.

In the circular recess $c^3$ of the valve-casing is secured a gas-holder A, which is made of sheet metal and open at its upper end, said holder being in communication with the supply branch $c^x$ through a passage $c^7$ and with the bore or valve-seat of the casing at a point above the outlet and supply branches thereof through a passage $f$, a like passage $g$ being formed in said valve-casing diametrically opposite the passage $f$ and in planes at right angles to the planes of the outflow and supply branches, said passage $g$ opening into the vessel B.

The valve C is a cylindrical plug-valve whose longitudinal bore merges into a lateral outlet-passage $b$, which lies in the plane of the outlet branch $c$ of the casing C', and with the inlet to the bore or axial passage of the plug-valve C communicates the siphon-pipe P, which passes fluid-tight through the bottom of the gas-holder A and is seated in the contracted portion $c^4$ of the valve-casing. The plug-valve C has a transverse gas-passage $a$ in its solid portion above its bore and in the plane of the outlet of passage $f$ and inlet of passage $g$. The outlets of the passage $a$ merge into external or peripheral channels $d$, formed in the plug-valve in the plane of but at right angles to and extending in opposite directions from said passage $a$. The width and depth of these channels $d$ decrease gradually from the passage $a$ to the outer end of said channels, where they merge into the outer face or periphery of the plug-valve, and are of such length that when the said valve is revolved to bring the outlet $b$ of its bore into register with the outlet branch $c$ of the casing communication will be established between the passages $f$ and $g$ as soon as communication commences to be established between $b$ and $c$, so that before the latter are in full register gas will flow from the reservoir A to the vessel B. Inasmuch as the channels $d$ are so arranged that the communication between $f$ and $g$ is first established through the narrower and shallower ends of the channels $d$, it is obvious that the volume of gas flowing from A to B is very small, and as said channels increase in depth and width from said narrower and shallower ends to the cross-passage $a$ the volume of gas flowing from A to B will gradually increase until the full flow is established, which will take place when the outlets $b$ and $c$ are in full register. This is clearly shown in Figs. 3 to 5, Fig. 3 showing the plug-valve in its closed position, Fig. 4 in its fully-opened position, and Fig. 5 in that position in which communication begins to be established between the outlets $b$ $c$ and between the gas-passages $f$ $g$ through the narrower and shallower ends of the channels $d$. It will readily be seen that through the means described the gas for forcing the liquid from vessel B is gradually supplied to said vessel. Hence the liquid is gradually forced therefrom, and as the pressure in B gradually increases the volume of liquid flowing from B also gradually increases until the full pressure and flow is established, which will be the case when $b$ and $c$ are fully in register, as above stated, and at no other time, whereby the sudden forcing of the liquid and the inconvenience inherent thereto is avoided.

In order to prevent the plug-valve from being turned in the wrong direction, as from left to right, for instance, Figs. 3 to 5, wherein the plug should be turned from right to left to accomplish the desired results, a stop-pin may be provided that passes through the casing C' into a segmental groove in the periphery of the plug, or the plug may have a short stud or pin $p$, Figs. 1 and $5^a$, working in a groove in the inner face of the plug-seat.

To the upper exteriorly-threaded enlarged portion $c^5$ of the valve-casing C' is screwed a sleeve S, that has an inner flange $s'$, which when screwed to said portion has bearing on a shoulder formed by a contracted upper portion of the valve-plug, whereby the latter is held against vertical displacement, said valve-plug being polygonal in cross-section at its upper end for the reception of a suitable key for manipulating said plug.

In Figs. 6 and 7 I have shown my invention in its application to barrels or casks, in which the construction of the dispensing valve or cock and the means for admitting the forcing-fluid to such barrel are modified to suit the altered conditions of use.

The valve-casing C' is secured to the gas-holder or reservoir A by soldering or otherwise, and to the bottom of said holder is secured a pipe P', through which the siphon-pipe P passes, and which is connected with the gas-passage $g$ by means of a pipe $g'$, that passes fluid-tight through the gas-holder, like the siphon-pipe. This dispensing apparatus is connected with a barrel through the medium of a screw-plug $p'$, in which the pipe P' is seated fluid-tight, said screw-plug being provided with suitable handles $p^2$. The valve-plug in this construction is a very short one, so that a correspondingly small valve-casing can be used. The plug-valve is here also revolved by a key K, detachable from the stem of the valve.

Having thus described my invention, what I claim as new therein, and desire to secure by Letters Patent, is—

1. The combination with a vessel for storing liquids, of a siphon-pipe extending into said vessel, a valve-casing provided with a discharge-pipe, a plug-valve seated and revoluble in said casing, and provided with a passage for liquid adapted to communicate with said siphon and discharge pipes, a reservoir for gas, gas-passages leading respectively from said reservoir and from the vessel into the seat for the plug-valve at points diametrically opposite each other, and a transverse gas-passage in said plug-valve adapted to be placed in communication with the aforementioned gas-passages, said transverse plug-passage merging into external plug-channels of a definite length in the same plane as but at right angles to and extending in opposite directions from said transverse passage, said channels decreasing in width and depth from the transverse passage to their outer end, for the purpose set forth.

2. The combination with a vessel for storing liquids, of a siphon-pipe extending into said vessel, a valve-casing provided with a discharge-pipe, a plug-valve seated and having a limited rotation in both directions in said casing, and provided with a passage for liquid adapted to communicate with said siphon and discharge pipes, a reservoir for gas, gas-passages leading respectively from said reservoir and from the vessel into the seat for the plug-valve at points diametrically opposite each other, and a transverse gas-passage in said plug-valve adapted to be placed in communication with the aforementioned gas-passages, said transverse plug-passage merging into external plug-channels of definite length in the same plane as, but at right angles to and extending in opposite directions from said transverse passage, said channels decreasing in width and depth from the transverse passage to their outer end, for the purpose set forth.

3. The combination with a vessel for storing liquids, of a siphon-pipe projecting into said vessel, a valve-casing provided with an outlet for liquid, a reservoir for gas secured thereto and through which the siphon-pipe passes, gas-passages in said casing leading from said reservoir and vessel respectively to a valve-seat in the casing at points diametrically opposite each other, a plug-valve revoluble in said valve-seat and provided with a passage for liquid adapted to communicate with the aforesaid siphon-pipe, and outlet for the liquid, and a cross-passage in said plug adapted to communicate with the outlet and inlet of the gas-passages in the valve-casing, said cross-passage in the plug merging at opposite ends into external channels of definite length in the plane of, but at right angles to, and extending in opposite directions from the terminals of said cross-passage, said channels of decreasing depth and width from said terminals to the end of such channels, substantially as and for the purpose set forth.

4. The combination with a vessel for storing liquids, of a dispensing-cock adapted to be secured to the open end of such vessel and comprising a valve-casing provided with an axial valve-seat and with an outlet for liquid, a reservoir for gas secured to the under side of said casing, a siphon-pipe in the inlet of the valve-seat and passing through said reservoir, means for supplying gas to the reservoir, two gas-passages leading from the reservoir and vessel respectively into the valve-seat in the valve-casing above the outlet for liquid thereof at points diametrically opposite each other, a plug-valve having limited rotation in both directions in said seat and provided with a passage for liquid in perpetual communication with the siphon-pipe and adapted to be placed in communication with the outlet for liquid in the casing, and a transverse gas-passage in said plug adapted to be placed in communication with the outlet and inlet of the aforementioned gas-passages in the casing, said transverse passage merging at each end into an external channel in the plane of but at right angles to and extending in opposite directions from the terminals of said transverse passage, said channels of predetermined length and of a decreasing depth and width from the terminals of the transverse passage to the opposite end of said channels, substantially as and for the purpose set forth.

In testimony that I claim the foregoing as my invention I have signed my name in presence of two subscribing witnesses.

PHILIPP BACH.

Witnesses:
HENRY HASPER,
W. HAUPT.